US005092489A

United States Patent [19]

Pastor et al.

[11] Patent Number: 5,092,489

[45] Date of Patent: Mar. 3, 1992

[54] DEVICE FOR THE AUTOMATIC DISPENSING OF BOTTLES, PARTICULARLY OF FLEXIBLE MATERIALS

[75] Inventors: Claude I. Pastor; Christian B. Pastor, both of Marseilles, France

[73] Assignee: Roland R. James, Corenc, France

[21] Appl. No.: 635,550

[22] PCT Filed: Jul. 7, 1989

[86] PCT No.: PCT/FR89/00357

§ 371 Date: Jan. 14, 1991

§ 102(e) Date: Jan. 14, 1991

[87] PCT Pub. No.: WO90/00784

PCT Pub. Date: Jan. 25, 1990

[30] Foreign Application Priority Data

Jul. 15, 1988 [FR] France ................ 88 09777

[51] Int. Cl.[5] ................ B65G 59/00

[52] U.S. Cl. ................ 221/108; 221/111; 221/266; 221/258; 221/196

[58] Field of Search ................ 221/68, 108, 111, 265, 221/266, 277, 258, 194, 196

[56] References Cited

U.S. PATENT DOCUMENTS

| | | | |
|---|---|---|---|
| 2,376,960 | 5/1945 | Clem | 221/266 |
| 2,682,440 | 6/1954 | Rogers | 221/111 |
| 2,771,215 | 11/1956 | Opgenorth et al. | 221/111 |
| 2,965,262 | 12/1960 | Du Bois | 221/277 |
| 3,360,163 | 12/1967 | Fessler | 221/277 |
| 3,795,345 | 3/1974 | Baxendale . | |
| 4,509,658 | 4/1985 | Oden . | |
| 4,511,059 | 4/1985 | Manzer . | |
| 4,511,060 | 4/1985 | Lindsey . | |
| 4,712,712 | 12/1987 | Garden | 221/68 |

FOREIGN PATENT DOCUMENTS

| | | | |
|---|---|---|---|
| 2259918 | 6/1974 | Fed. Rep. of Germany . | |
| 1091027 | 4/1955 | France . | |
| 686981 | 3/1965 | Italy | 221/108 |

*Primary Examiner*—H. Grant Skaggs

*Attorney, Agent, or Firm*—Ladas & Parry

[57] ABSTRACT

The subject of the present invention are devices for the automatic dispensing of bottles, notably in flexible material.

The technical sector of the invention is that of the manufacture of automatic vending machines of drinks in individual containers, of the bottle type, particularly of plastic and containing mineral water.

According to the invention the following devices consist of a drum (8) capable of rotation, which receives bottles (6) rolling from a chute (4), fed by ramps (15) set alternately. At each command by the customer for dispensing bottle, a chain drive system (9) provides this drum with an exact turn of rotation and makes the bottle fall into a hatch (7) accessible to the customer. When it returns to its resting position, the drum is reloaded with a new bottle, previously held in a waiting position by a stop mechanism (11) and the bottom of the drum.

8 Claims, 4 Drawing Sheets

DEVICE FOR THE AUTOMATIC DISPENSING OF BOTTLES, PARTICULARLY OF FLEXIBLE MATERIALS

The subject of the present invention is a device for automatic dispensing of bottles, particularly of flexible material.

The invention is aimed at the sector of manufacturing automatic vending machines for individually packaged drinks in bottle type containers.

One of the applications of the invention is the production of automatic coin-operated vending machines for dispensing plastic bottles containing mineral water.

Various types of hot and cold drink vending machines are already familiar; these are placed in the public thoroughfare or in public access areas in establishments such as schools, hospitals, sports arenas and public offices, receiving large numbers of people.

Such vending machines can be classified into two main classes:

the first, which includes most of the cold drink dispensers, containes all those that deliver individual rigid bottles, usually in glass, that the consumer extracts by opening a flap which retains the said bottle, this flap only being freed after payment of the price (in coinage or tokens), and which locks the next bottle after extraction of the previous one.

Bottles are automatically reloaded behind this flap from an inclined ramp staorge area with sufficient slope for the bottles to slide under their own weight so as to take up the position of the bottle to be taken by the consumer. There is generally access to each end of each of the ramps which are therefore arranged one above the other amnd parallel to each other so as not to waste space; this also enables bottles of different types of drink to be placed on each row. For vending machines with only one type of drink, a single access can be common to several rows, which then feed a single channel in which the bottles pile up several high.

Particular mention can be made of certain glass bottle vending machines distributed under the brand name "DIAM".

Mention can also be made of vending machines such as those described in patent No. FR 1.091.027 of the *Societe Anonyme Francaise des Appareils Automatiques*, applied for on the 10th Oct. 1953 under a "dispenser of cylindrical objects", consisting of a cabinet containing ramps arranged alternately and of a gearwheel with cradles receiving several objects at a time and dispensing one by one using their weight as a drive mechanism.

Finally mention will be made of the American patents of Messrs ODEN U.S. Pat. No. 4,509,658, LINDSEY U.S. Pat. No. 4,511,060 and MANZER U.S. Pat. No. 4,511,059 applied for in 1985 on various types of vending machines for cylindrical cups, placed in a vertical channel to receive and dispense containers one by one.

Other machines are also manufactured and amongst others distributed by various Italian, American, German and Japanese companies, who have applied for patents on certain parts of their machines: either for anti-vandalism of anti-theft systems, or for the coin-operating system, or for temperature control, etc. All this is well known in the field of vending machines of drinks in bottles or cans, but always in containers made of rigid materials such as glass or metal.

The second class of drink vending machines, which also includes vending machines of cold drinks, covers all those that deliver the liquid in individual cups; hot drinks are almost always dispensed by this method.

The cups, generally of plastic, are delivered empty by a vertical drum system, in which they are piled up one on top of another and from where they fall one by one into the access of the consumer, when he or she introduces the correct coin or token into the machine.

The cup is then held under a filling spout from which is poured the the cold or hot liquid which is either ready-made or prepared on request in a single container. Many patents have been taken out in this field of automatic vending machines.

Among this type of dispenser of hot drinks in cups, mention can be made of the Danish company WITENBORG AUTOMATFABRIKER AS, for which two patents have been applied for, the first published on the 23rd Nov. 1979 in FRANCE under the Nos. FR. 2.423.991 and FR. 2.424.010, the first concerning a "procedure and machine for preparing drinks in portions" and the second a "machine for preparing drinks, specially coffee, to be used in particular in automatic vending machines".

As the titles of these patents indicate, their content refers essentially to the components enabling the drink to be reconstituted, the dispensing and the filling of the cups being otherwise known.

None of the machines described above however enables drinks to be dispensed in closed containers made of flexible materials, for in the first class of vending machines it is a question of rigid containers and plastic bottles for example would become crushed against each other inside or would split open when the customer or vandal tried to extract them, and in the second class, it is a question of flexible but open containers.

Certain manufacturers have tried to design vending machines specially for this type of flexible, closed container, but each product has been very voluminous with for example turning drums as for solid food vending machines, which are fragile and can only stock a few containers at a time, requiring frequent visits by staff to reload them. These solutions are therefore very expensive, because this type of container is especially used for low-value drinks such as mineral water, whose sales prices is too low to recover the costs of the machine and the expensive running costs.

The problem presented is to produce an automatic dispensing machine for bottles in flexible material, which is compact and enables a large number of both large and small bottles to be stocked, so that it does not need frequent reloading, which does not damage the bottles and distributes the said bottles without risk of splitting, and without the possibility of fraud.

One solution to the problem presented is an automatic bottle dispensing device comprising a closed cabinet, including a system for storing the said bottles, composed of alternate ramps sloping in opposite directions and grouped into sets, one on top of the other, with parallel slopes and fixed alternately against the two side walls of the said closed cabinet, such that the upper ramp in each set receives the bottles descending by gravity from the set above, the cabinet being maintained at constant temperature by known means and containing a coin-operated device using coins or tokens enabling users to order the dispensing of one or more bottles, a manual access hatch of known type for receiving the bottles, a cylindrical drum capable of rotation, a drum of any form (8) capable of rotation, only taking one bottle at a time and enabling dispensing, characterised in that:

the said ramps 15 are grouped into series of at most two ramps and continuously load a supply chute 4 of the drum;

any means of stopping 11 the said bottles is placed in front of the said supply chute 4 and above the said drum 8, leaving a space sufficient for the descent by gravity of a single bottle $6_2$ into the drum and then allowing the next bottle to be locked $6_3$ into a waiting position until the preceding bottle $6_2$ has been dispensed by the rotation of the drum;

the said drum 8 is placed below the said supply chute, such that the bottles 6 arriving onto the said chute 4 can either fall freely and not too violently into the drum 8 when this is empty and the edge 18 of its opening is aligned along the end lip of the chute 4, or, alternatively, rest stopped on the said chute either by a bottle already in the drum 8 or by the bottom of the said drum and the said stop mechanism 11 when the drum turns on its axis (17);

a drive system 9 of the said drum axis is linked to any type of motor 10 providing exactly one rotation stop of this drum for each command for dispensing a bottle $6_1$.

The result is a new device for automatic dispensing of bottles specially adapted for those made of flexible material, of the type containing mineral waters.

The advantages of such a device are numerous, especially in applications for dispensing large volume plastic bottles. The main characteristic is in fact that at no moment are the said bottles subject to any crushing effects capable of damaging them and neither do they pass through mechanical systems that might tear them. Their walls are fragile, so their storage and movement through the device the subject of the invention is carried out without subjecting them to sudden shocks, gas is the case with vending machines known to date.

In addition, a dispenser manufactured with the device, the subject of the invention, is robust and reliable, while at the same time bing simple to produce, enabling it to be put on the market at a reasonable price compatible with recovering its costs by vending mineral water at the relatively low price needed to attract customers.

Several types of vending machines for different sized bottles could be produced by following the same invention: from a half liter up to a liter and a half, for example, to adapt to the requirements of the sites on which the machines would be installed.

The devices described below also provide a valuable compactness for the cabinets forming the outside of the vending machines.

For example, a machine capable of containing 60 one and a half liter bottles would only be about 1.50 m high, and with the same height, a machine could contain at least 120 bottles of 0.5 liters.

This compactness thus reduces the internal volume which is maintained at a constant, preferably cool, temperature by a low-power refrigeration unit and enables the machines to be easily installed on site, even in places whefe problems of space are crucial.

Vending machines made according to the invention dispensing one and a half liter bottles would find a profitable application in hospitals and clinics.

The following description refers to the attached drawings, which are not exhaustive, and describe the production of an automatic bottle dispenser, containing the devices according to the invention, figured by way of illustration of the dispenser, but other products and other applications could be envisaged.

Figure 1A:
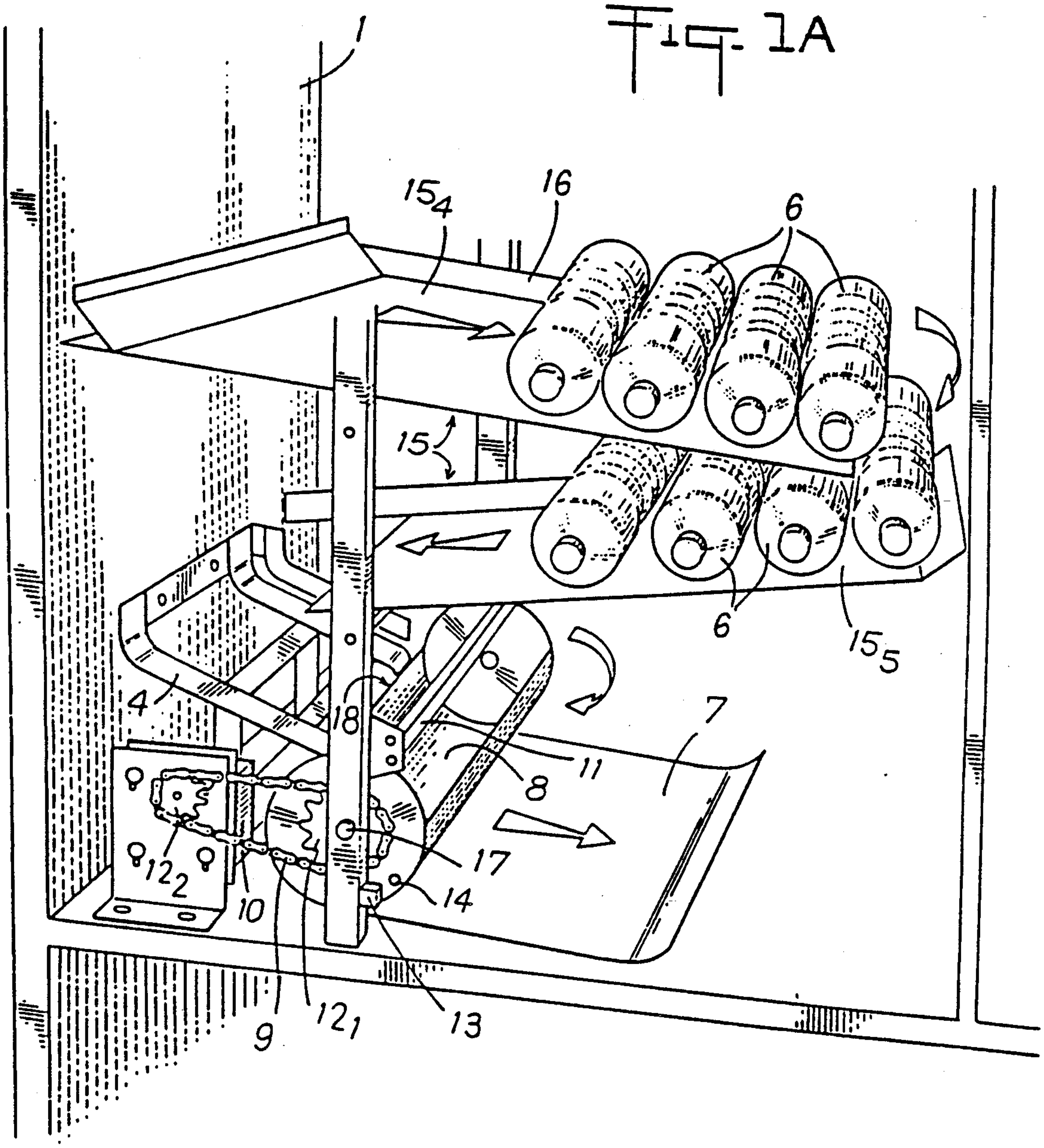
FIGS. 1A and 1B are perspective views of two systems for dispensing bottles.
Figure 2:
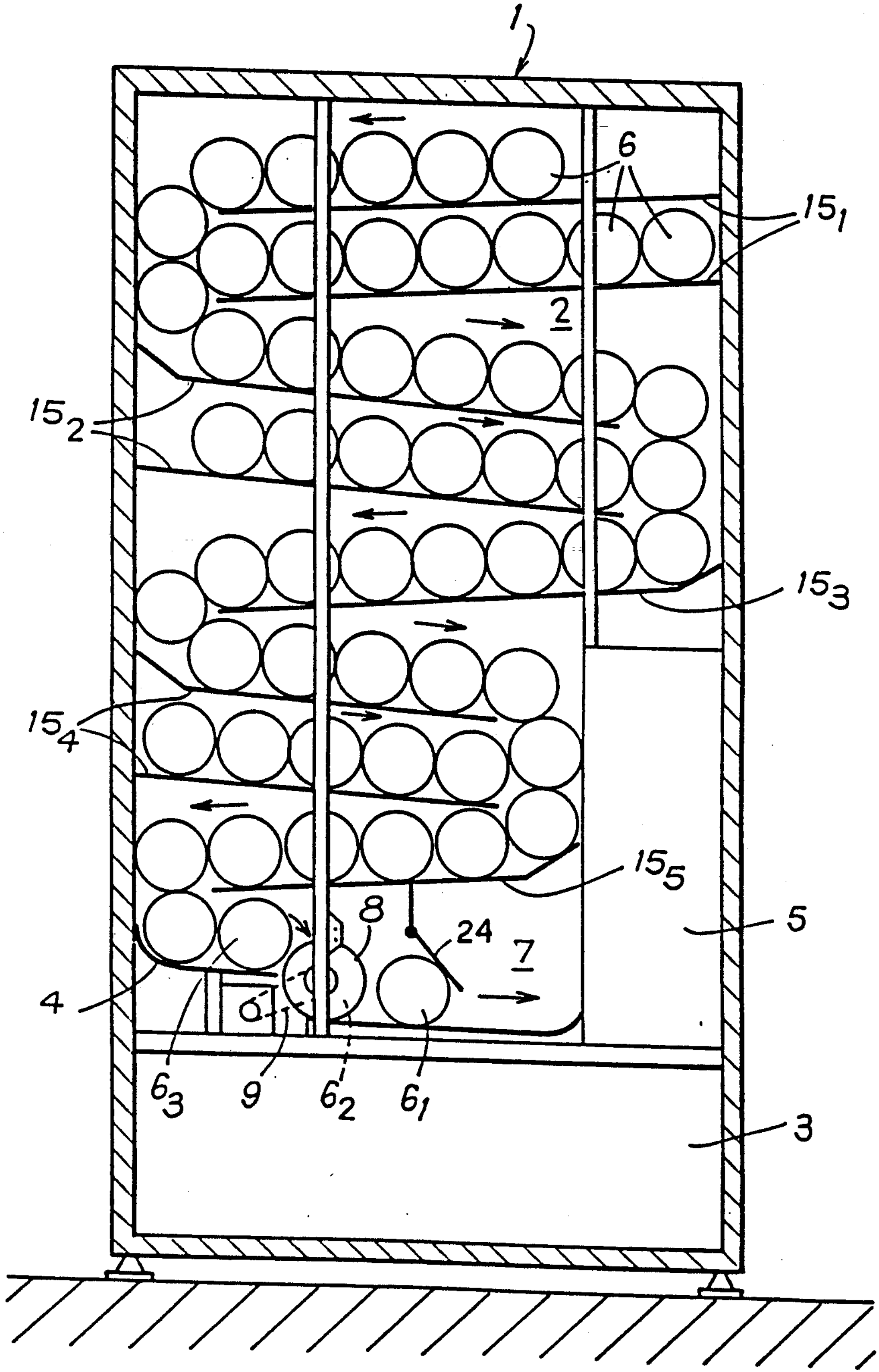
FIG. 2 is a sectional view from the front of a cabinet of a bottle dispensing machine with its storage system.

FIG. 1A is a partial perspective view of a cabinet 1 of a bottle dispensing machine, representing in particular the bottle dispensing part itself from the supply chute 4, continuously loaded by the ramps 15 of the storage system 2, situated above and described in FIG. 2.

The bottles 1 can be of fragile material, of the flexible plasic type and slide or roll by gravity along the ramps $15_4$ and $15_5$, which are sufficiently inclined for this purpose and fixed alternately against opposite walls of the cabinet 1. The bottles can have a volume of 0.1 to 1.5 liters and fall one by one at the end of their course onto the chute 4, which is also sloping and fixed to a wall of the cabinet 1.

These ramps and chutes can be of any material and any form of smooth sloping construction, for example of solid sheet steel as figured for ramps $15_4$ and $15_5$ or of an open structure of rails and metal strips, as shown for the chute 4. The width of these ramps corresponds exactly to the length of the bottles which are guided by any means such a flanged edge 16, and at the other side, for example by the door, not shown on the diagram, but which closes the front of the cabinet 1, after the ramps have been filled.

A hollow cylindrical drum 8, with inside dimensions slightly greater than those of the said bottles 6, and open over about a half of its circumference and whose axis is situated in the plane of that of the bottle waiting on the said chute 4 and making an angle with the plane of the said chute of between zero and the angle made by the plane bisecting the planes of the chute and the perpendicular to the plane of the chute.

This drum is mounted so as to be capable of rotation around its axis 17, which is fixed to the structure of the cabinet 1. Its position is determined in such a way that the bottles arriving on the chute 4 can either slide or fall freely but not too violently into the drum 8 when this is empty and when the edge 18 of its opening is aligned along the edge of the chute 4, or rest stopped on the said chute without being crushed by the following bottles, either by a bottle already in the drum 8, or by the bottom of the said drum, when this has revolved on its axis 17.

To prevent bottles waiting on the chute 4 from advancing or passing on top of the drum 8, a stop mechanism 11 is placed in front of the chute 4 and above the drum 8, leaving sufficient space for the passage of one bottle between the edge of the support 4 and itself. This stop mechanism 11 could be made of at least one circular cross-section rod, free to rotate about its axis, against which the bottles would come to rest one after another before slipping into the said drum 8, thus revolving the said rod.

The drum 8 is turned by any system, preferably by a chain 9 mounted on toothed gear wheels, of which one $12_1$ is fixed to the drum axis and the other $12_2$ to the axis of the motor 10 with a slow output speed.

This drive system (9) provides one exact step of the said drum 8, for each command for dispensing a bottle: in the case of a cylindrical drum as here the step is one complete revolution. To do this, according to one particular production method, the said motor 10 is electric and supplied by a timer relay controlled by the introduction of a coin or token, of known material, into a coin-operated system, the relay stopping the motor after a determined period of time corresponding to the exact rotation by one step of the said drum 8.

According to another particular production method, the said motor 10 is electric, and also commanded by the introduction of a coin or token into the coin-operated system, but the electric current is cut when a sensor 13, of known type, aligns with a reference point 14 on the said drum, corresponding to a single step of rotation, or of a complete revolution for a cylindrical drum.

Thus, for each bottle command, the drum 8 loaded with a waiting bottle, turns on its axis, blocking the following bottles between its base, the edge of the said chute 4 and the stop rod 11; when the opening is inclined sufficiently towards the sloping steel sheet of the manual access hatch 7, of known type, the bottle it contains rolls onto this sheet and arrives in a position where it can be collected by the customer. The drum continues in its rotation and when its opening again arrives under the chute 4, such that its edge 18 is aligned close to, or better exactly along the edge of the chute 4, the next bottle slides inside the drum, and again stops in a waiting position for another dispensing command. The place freed by the bottle which has thus fallen gently into the drum is taken by the next bottle and so on, along the length of the chute 4 and the ramps 15.

Figure 1B:
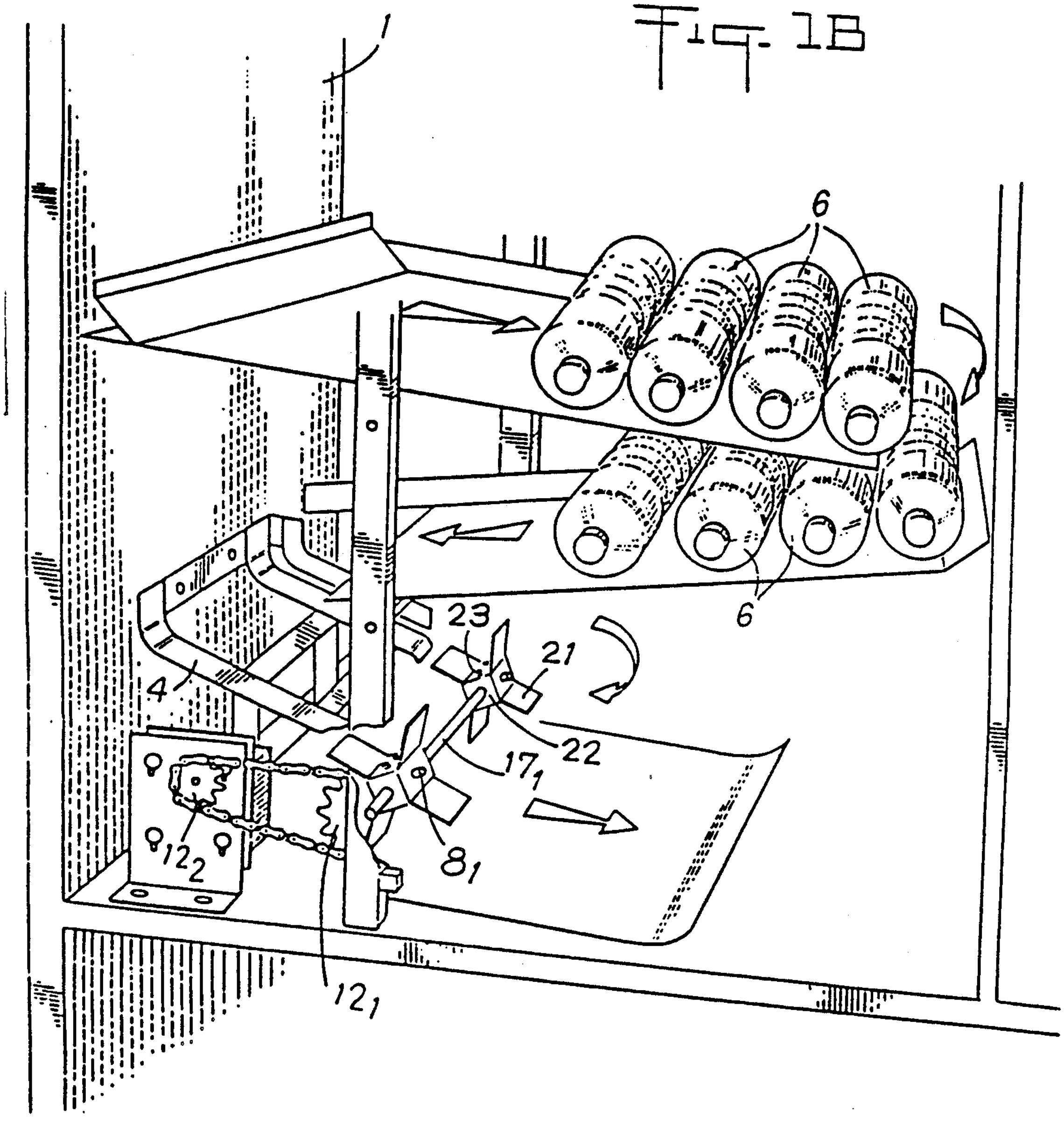

FIG. 1B is a partial perspective view of the cabinet 1 as in FIG. 1A with a drum $8_1$ of a different type from the preceding and represents in partial cut-away the components $12_1$ which have previously been described.

In this example, the said drum $8_1$ is made up of at least three and at most five sets of wings 21 mounted around the spindle 17, by any means of attachment and in which each space between two wings can receive one of the said bottles 6, the said drum is mounted such that it can only load one bottle at a time, and that during its rotation the said bottle never follows a line of movement having a positive slope above the horizontal.

As with the cylindrical drum, the bottles must never in fact rise in their movement to avoid problems of crushing against their followers, which is the critical problems for flexible containers, and to ensure the most "gentle" fall possible, in contrast to the procedures and devices used and known up until now.

By preference, use is made of a drum with four sets of wings 21, mounted in pairs at the two ends of the spindle $17_1$ on two supporting blocks 22 and attached to the spindle by fixing screws 23. The step of rotation for the said drum $8_1$ for the dispensing of one bottle is therefore one quarter of a revolution of the drum.

FIG. 2 is a sectional view of a bottle 6 dispensing machine cabinet from the front, with its storage system 2 and its system for actually dispensing, from the drum 8 already described in FIG. 1.

The cabinet itself 1 is insulated, of a traditional type which can be maintained at a constant, preferably cool, temperature by a refrigeration unit of known type 3. Its also contains a coin-operation system 5, of known type, enabling any person to order the dispensing of one or more bottles 6, by introducing coins or tokens, corresponding to the price previously determined by the installer. When the price has been paid and identified by the coin-operated system, the dispensing procedure described in FIG. 1 is carried out automatically by means of the dispensing device produced according to the invention.

The storage space itself 2 is therefore made up of the three vertical walls and the top and bottom of the cabinet 1: the front face is usually composed of an opening door, not figured on the drawings, which provides access to all of the workings when open and closes the entire front when closed.

The storage of the bottles in this cabinet 1 is composed of two series of ramps 15, sloping sufficiently in opposite directions and one above the other in sets of two at most, the sets being fixed alternately to one or other of the side walls of the said cabinet 1; so that ramps $15_1$, $15_3$ and $15_5$ are fixed to one wall and $15_2$ and $15_4$ to the other wall.

Only ramps $15_3$ and $15_5$ are figured here, but they could be double. It is not conceivable, for large volume bottles of flexible materials, to place more than two ramps in a set, since this already represents three bottles on top of each other at the ends and beyond this they risk being crushed together under their own weight.

This optimal configuration enables each of the upper ramps in each set to receive the bottles from the set situated just above; because the slope of the ramps is sufficient, the bottles descend by gravity either sliding or rolling.

The lowest ramp $15_5$ enables the supply chute of the drum 8 to be loaded, as described in FIG. 1. Thus all the bottles are led one after another to the dispensing unit, and when the cabinet 1 is empty, all the ramps can be reloaded by opening the cabinet 1 by its front face.

The number of ramps and their length are not limited, and are to be determined in relation to the number of bottles that it is desirable to stock and the maximum desired dimensions of the cabinet.

The dispensing system by drum 8 discharges each bottle into the hatch 7, which can be of any known type, with for example two doors closed by springs, of which one 24 isolates the storage and dispensing section to give better thermal insulation, but also to limit attempts at theft, and the other attached to the door which closes the front face and which the customer opens to take the bottle.

Figure 3:
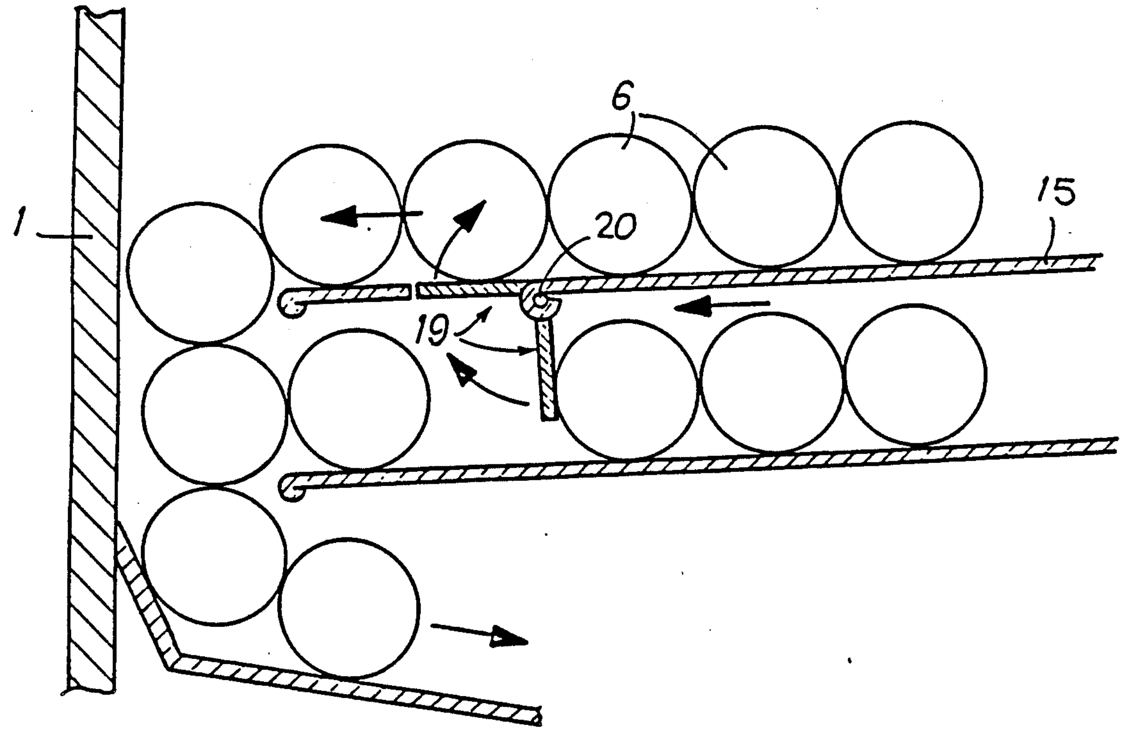
FIG. 3 is a section of blocking bracket.

FIG. 3 is a vertical section of the storage system seen from the front, showing a blocking bracket 19, situated close to the end of the upper sloping ramp 15 of each set of ramps on which slide or roll the bottles 6.

The bracket 19 is free to swivel around its axis 20 close to the edge of the ramp; it is sufficiently wide in the plane perpendicular to the figure to provide a support for the bottles 6, without any risk of these pivoting or becoming blocked against the guides 16 of the ramps as described in FIG. 1.

The lengths of the surfaces made up by the bracket 19 are such that so long as there are still bottles on the upper ramp 15, the weight of one of these passing on top maintains the bracket in the closed position, as shown on the figure, thus blocking all the bottles stored on the ramp just below.

This system prevents crushing and blockage by bottles in two ramps pressing simultaneously on the one at the end against the wall of the cabinet 1, before it can descend in the vertical space towards the lower ramps; when all the ramps are full, if this bracket were not present, these bottles at the ends risk becoming stuck without descending.

This optional bracket enables only one ramp to be freed at a time, thus avoiding this inconvenience, while safeguarding the flexible containers, despite their fragility. When the upper ramp has only a few bottles left, and the upper face of the bracket is free, the weight of the bottles on the lower ramp raises the bracket thus freeing the said ramp.

The present invention is not limited to the production methods described above which are only examples of manufacturing to which modifications and variants could applied.

I claim:

1. Device for the automatic dispensing of bottles comprising a closed cabinet, having two side walls, and including a storage system for said bottles, said storage system including alternate ramps sloping in opposite directions and grouped into sets, one on top of the other, with parallel slopes and fixed alternately against the two side walls of said closed cabinet such that an upper ramp in each set receives the bottles descending by gravity from the set above, the cabinet being maintainable at a constant temperature and containing a means for accepting payment enabling persons using the device to order the dispensing of one or more bottles when payment is received in the means for accepting payment, said device also including a manual access hatch to provide the person using the device with access to the dispensed bottles, said device also including a rotatable device for depositing said bottles onto said manual access hatch, said device for depositing said bottles having at least one opening defined therein so as to receive and dispense only one bottle at a time, wherein said ramps are grouped in sets of at most two ramps and continuously load a supply chute positioned adjacent said device for depositing said bottles, and wherein a means for stopping the said bottles is placed in front of said supply chute and above the said device for depositing said bottles, leaving a space sufficient for the descent by gravity of a single bottle into the device for depositing said bottles and then allowing the next bottle to be locked into a waiting position until the preceding bottle has been dispensed by the rotation of the device for depositing said bottles, said device for depositing said bottles being placed below the said supply chute such that the bottles arriving onto said chute can either fall freely, and not too violently, into the device for depositing said bottles when the device for depositing said bottles is empty and an edge of the opening, of said device for depositing said bottles, is aligned along an end lip of the chute, or, alternatively, the bottles arriving onto said chute can be stopped on the said chute either by a bottle already in the device for depositing said bottles or by a closed portion of the said device for depositing said bottles and the means for stopping when the device for depositing said bottles is rotated, and wherein said device further including a drive system connected to said device for depositing said bottles and a motor to rotate said device for depositing said bottles a predetermined amount for each order for dispensing a bottle.

2. A device for automatic dispensing of bottles according to claim 1, wherein said drive system including a chain connected to toothed gear wheels, with one gear wheel being fixed to the device for depositing said bottles and an other gear wheel being fixed to the motor, which has a slow output speed, so that rotation of said other gear wheel by said motor rotates said one gear wheel and said device for depositing said bottles.

3. A device for automatic dispensing of bottles according to claim 1, wherein said motor is electric with a slow output speed and stops after a determined period of time corresponding to the predetermined amount of rotation of said device for depositing said bottles.

4. A device for automatic dispensing of bottles according to claim 1, further comprising a sensor, positioned in alignment opposite a reference point on the said device for depositing said bottles, to cut the power supply to said electric motor when said reference point comes back into alignment with said sensor after said device for depositing said bottles has been rotated the predetermined amount corresponding to the dispensing of a single bottle.

5. A device for automatic dispensing of bottles according to claim 1 wherein said means for stopping said bottles includes at least one rod having a circular cross-section, free to rotate about its longitudinal axis, against which the bottles come to rest, one after another, before slipping into said device for depositing said bottles, and thus revolving said rod.

6. A device for automatic dispensing of bottles according to claim 1, wherein the upper ramp of each set of ramps is fitted with a pivoting blocking bracket extending downward towards an adjacent lower ramp and situated close to an end of said upper ramp, said blocking bracket being free to swivel close to the end of the upper ramp so that in an open position the bottles on the lower ramp can descend by gravity, and in a closed position the weight of a bottle on the upper ramp passing on top of said blocking bracket presses said blocking against said adjacent ramp to maintain those bottles on the lower adjacent ramp in a waiting position.

7. A device for automatic dispensing of bottles according to claim 1 wherein said device for depositing said bottles is a hollow cylindrical drum, with inside dimensions slightly greater than those of the said bottles, and open over about a half of its circumference and having a longitudinal axis situated in the plane of that of the bottle waiting on said chute and making an angle with the plane of said chute of between zero and the angle made by the plane bisecting the plane of the chute and the perpendicular to the plane of the chute.

8. A device for automatic dispensing of bottles according to claim 1 wherein said means for stopping said bottles and said device for depositing said bottles is a spindle having at least three, and at most five, sets of wings mounted around the spindle and in which each space between two wings can receive one of the said bottles, said spindle and wings being mounted such that said wings contact bottles on said chute so that only one bottle is received into each space at a time, and that during rotation said received bottle never follows a line of movement having a positive slope above the horizontal.

* * * * *